US012793101B2

(12) United States Patent
Wessel et al.

(10) Patent No.: US 12,793,101 B2
(45) Date of Patent: Nov. 10, 2026

(54) SYSTEMS AND METHODS FOR MEASURING IN-STORE MEDIA EXPOSURE

(71) Applicant: The Kroger Co., Cincinnati, OH (US)

(72) Inventors: Michael Wessel, Cincinnati, OH (US); Erin Creelman, Cincinnati, OH (US); Brandon Gilbert, Cincinnati, OH (US); Brad Johnson, Cincinnati, OH (US); Joe Kerns, Cincinnati, OH (US); Paul Justice, Cincinnati, OH (US); Richard Inman, Cincinnati, OH (US); Rachel DaDamio, Cincinnati, OH (US); Andrew Garner, Cincinnati, OH (US)

(73) Assignee: THE KROGER CO., Cincinnati, OH (US)

( * ) Notice: Subject to any disclaimer, the term of this patent is extended or adjusted under 35 U.S.C. 154(b) by 0 days.

(21) Appl. No.: 19/018,706

(22) Filed: Jan. 13, 2025

(65) Prior Publication Data

US 2025/0232332 A1 Jul. 17, 2025

Related U.S. Application Data

(60) Provisional application No. 63/619,892, filed on Jan. 11, 2024.

(51) Int. Cl.
*G06Q 30/0242* (2023.01)
*H04W 4/029* (2018.01)

(52) U.S. Cl.
CPC ........ *G06Q 30/0246* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 10,360,571 | B2 | 7/2019 | Garel et al. |
| 10,853,825 | B2 | 12/2020 | Garel et al. |
| 10,977,672 | B2 | 4/2021 | Garel et al. |
| 11,042,890 | B2 | 6/2021 | Garel et al. |
| 11,049,120 | B2 | 6/2021 | Garel et al. |
| 11,301,880 | B2 | 4/2022 | Garel et al. |
| 12,026,731 | B2 | 7/2024 | Garel et al. |
| 12,354,121 | B2 | 7/2025 | Garel et al. |

(Continued)

*Primary Examiner* — Allan J Woodworth, II
(74) *Attorney, Agent, or Firm* — Stites & Harbison PLLC; Terry L. Wright

(57) ABSTRACT

A method for measuring in-store media exposure includes an initial step of providing a cart to a customer and that includes an emitting device. As the customer moves the cart around a store, which also includes a plurality of advertising displays, cart location data is collected. At a point of sale terminal or checkout locations, customer identification data is obtained from the customer and is associated with the cart location data to thereby measure an effectiveness of the advertising displays in modifying purchasing behavior of the customer. Systems for measuring such in-store media exposure are also provided and comprise a plurality of carts having emitting devices, a plurality of advertising displays positioned around a store with each advertising display including a reading device configured to record cart and time data, and a central computer configured to receive the data and measure the effectiveness of the advertising displays.

16 Claims, 3 Drawing Sheets

(56) References Cited

U.S. PATENT DOCUMENTS

| | | | | |
|---|---|---|---|---|
| 2008/0237339 | A1* | 10/2008 | Stawar | B62B 3/142<br>235/383 |
| 2008/0238009 | A1* | 10/2008 | Carpenter | G06Q 30/0633<br>280/33.992 |
| 2019/0108396 | A1* | 4/2019 | Dal Mutto | G06V 10/82 |
| 2024/0221026 | A1* | 7/2024 | Freeman | G06Q 30/0242 |

* cited by examiner

SYSTEMS AND METHODS FOR MEASURING IN-STORE MEDIA EXPOSURE

RELATED APPLICATIONS

This application claims priority from U.S. Provisional Application Ser. No. 63/619,892, filed Jan. 11, 2024, the entire disclosure of which is incorporated herein by this reference.

TECHNICAL FIELD

The present invention relates to systems and methods of measuring in-store media exposure. In particular, certain embodiments of the present invention relate to systems and methods of measuring in-store media exposure by tracking a cart location in relation to advertisements placed around a store and then associating that cart location with a specific customer during checkout.

BACKGROUND

Online digital advertisers can readily monitor what advertisements specific consumers see and determine whether these advertisements affect consumer purchasing behavior due to the fact that much of the consumer's online behavior can be monitored without issue. Retail stores, such as grocery stores and supermarkets, however, have difficulty in obtaining the same individual consumer level data. Certain developments have been attempted to acquire similar data in traditional retail environments, such as cell phone or Radio Frequency Identification (RFID) tracking of shopping carts and/or on-cart media displays.

In the case of cell phone tracking, however, geolocation data is gathered but requires an opt-in by the customer in order to be compliant with state and federal privacy regulations. The need to have customers opt-in then results in a much lower data capture rate for suitable one to one household level measurements.

RFID Tracking of shopping carts in a retail environment similarly fails to connect sufficient pieces of information to measure media effectiveness. Furthermore, this technology can also be quite invasive when it comes to personal location and geolocation information.

For displaying on-cart media on a tracked cart, customers also have to self-identify on the cart to receive targeted messaging, which lowers the amount of households who would opt into the solution. Furthermore, this requires a display screen for every individual customer that a company may want targeted by the advertisement. Including digital screen interfaces on every cart within a store is not only a large upfront cost, but results in ever increasing expenses associated with upkeep, such as the replacement of broken screens and the like.

Therefore, there is still a need for a low-cost, effective, and accurate way to measure in-store media exposure.

SUMMARY

The present invention includes systems and methods for measuring in-store media exposure. In particular, certain embodiments of the present invention relate to systems and methods for measuring in-store media exposure whereby a cart location is tracked in a store in relation to advertisements placed around the store and then the cart location is associated with a specific customer during checkout.

In one exemplary system for measuring in-store media exposure, a cart or a plurality of carts are provided with each cart including an emitting device. A plurality of advertising displays is also included in the system with the advertising displays positioned around a store, and with each advertising display including a reading device for receiving a transmission from the emitting device and that is configured to record time data for when each cart was in proximity to the advertising display. The time date also includes how long the cart was in proximity to the advertising display. A central computer is then further included in the system and is configured to receive the time data from each of the advertising displays and then associate the time data with advertising display data from each of the advertising displays to measure an effectiveness of the advertising displays in modifying purchasing behavior of a customer. In some embodiments, the advertising display data includes at least one of: the advertisement displayed, which one of the plurality of advertising displays displayed the advertisement, and when the advertisement was displayed. In some embodiments, the emitting device associated with each cart is a Bluetooth® (Bluetooth SIG, Inc., Kirkland, WA) low energy emitting device, such that a Bluetooth® low energy reading device is then located in proximity to each of the advertising displays.

To associate an identity of the customer and any data related with the customer to time data and any other data obtained from the cart, the system further includes a point-of-sale ("POS") terminal or other similar device at a check-out of the store and that is in communication with the central computer. The point of sale terminal is configured to obtain customer identification data of the customer, such as by being configured to scan a loyalty card of the customer. In some embodiments, a Bluetooth® low energy reading device is also located in proximity to and/or is operably connected to the POS terminal, such that the customer identification data is obtained by the POS terminal and can be transmitted to the central computer where it is associated with the time data and other data collected from the cart.

By making use of the exemplary systems, the present invention further provides methods for measuring in-store media exposure. In one exemplary implementation, a method for measuring in store media exposure comprises an initial step of providing a cart that includes an emitting device. As a customer moves around a store with the cart, cart location data is then collected as the customer and cart come into proximity with a plurality of advertising displays positioned around the store. At checkout, customer identification data can then be obtained from the customer, and the customer identification data can be associated with the cart location data to thereby then measure an effectiveness of the advertising displays in modifying purchasing behavior of the customer.

With further regard to the collection and transmission of data in the exemplary methods, in some implementations, the emitting device associated with each cart is a Bluetooth® low energy emitting device, and a Bluetooth® low energy reading device is located in proximity to each of the advertising displays. In such implementations, the cart location data can thus include time data for when the cart was in proximity to each advertising display and for how long the cart was in proximity to each advertising display. In some implementations, in addition to collecting the cart data, advertising display data is also collected at the same time the cart location data is collected and, in certain implementations, the advertising displays include digital displays configured to display multiple different advertisements such that the advertising display data includes at least one of: the advertisement displayed, which of the plurality of advertising displays displayed the advertisement, and when the advertisement was displayed. Upon collection of the data, in some implementations of the method, the cart location data is associated with the advertising display data.

To obtain further location data for the cart and to, in turn, associate a particular cart and the collected data with a particular, customer in association with the exemplary methods, the store in which the cart is being used again includes a checkout counter having a Bluetooth® low energy reading device is located in proximity to the checkout counter. In this regard, in some implementations of the methods, the customer identification data that is obtained is then associated with the cart location data obtained at checkout when the customer uses their loyalty card at checkout. Further, when the customer uses their loyalty card at checkout, in some implementations, purchase information is then obtained and the purchase information is associated with the cart location data, such that the purchasing information can also be compared to historic customer purchasing data to further measure the effectiveness of the advertising displays in modifying purchasing behavior of the customer.

Further features and advantages of the present invention will become evident to those of ordinary skill in the art after a study of the description, figures, and non-limiting examples in this document.

DESCRIPTION OF EXEMPLARY EMBODIMENTS

The present invention includes systems and methods of measuring in-store media exposure. In particular, certain embodiments of the present invention relate to systems and methods for measuring in-store media exposure that include tracking a cart location in relation to advertisements placed around a store and then associating that cart location with a specific customer during checkout.

Although the system and methods of the present invention can be implemented across a variety of different types of stores or retailers, the following description focuses on one exemplary embodiment in which the present invention is implemented in a grocery store.

As is typical of most grocery stores, a customer picks up a cart shortly before or immediately after entering the store. The customer will then walk through the store selecting various items for purchase before proceeding to a checkout counter to pay for the items. Many grocery stores also provide customer loyalty cards that are scanned at checkout to provide discounts, coupons, or other benefits to the customer based upon the customer's purchases.

Figure 1:
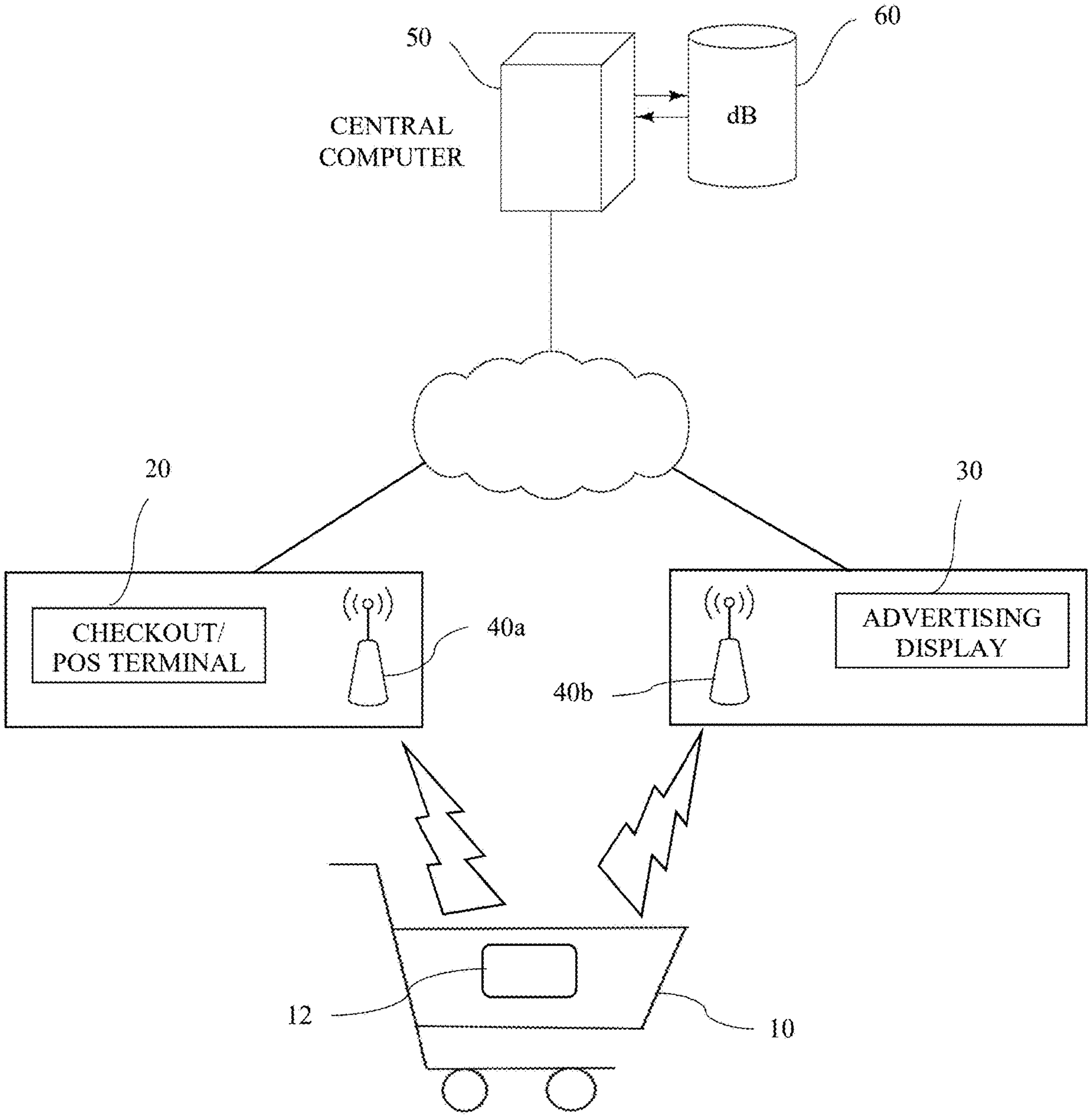
FIG. 1 is a block diagram showing an exemplary system for implementing a method for measuring in store media exposure in accordance with one embodiment of the present invention.
Figure 2:
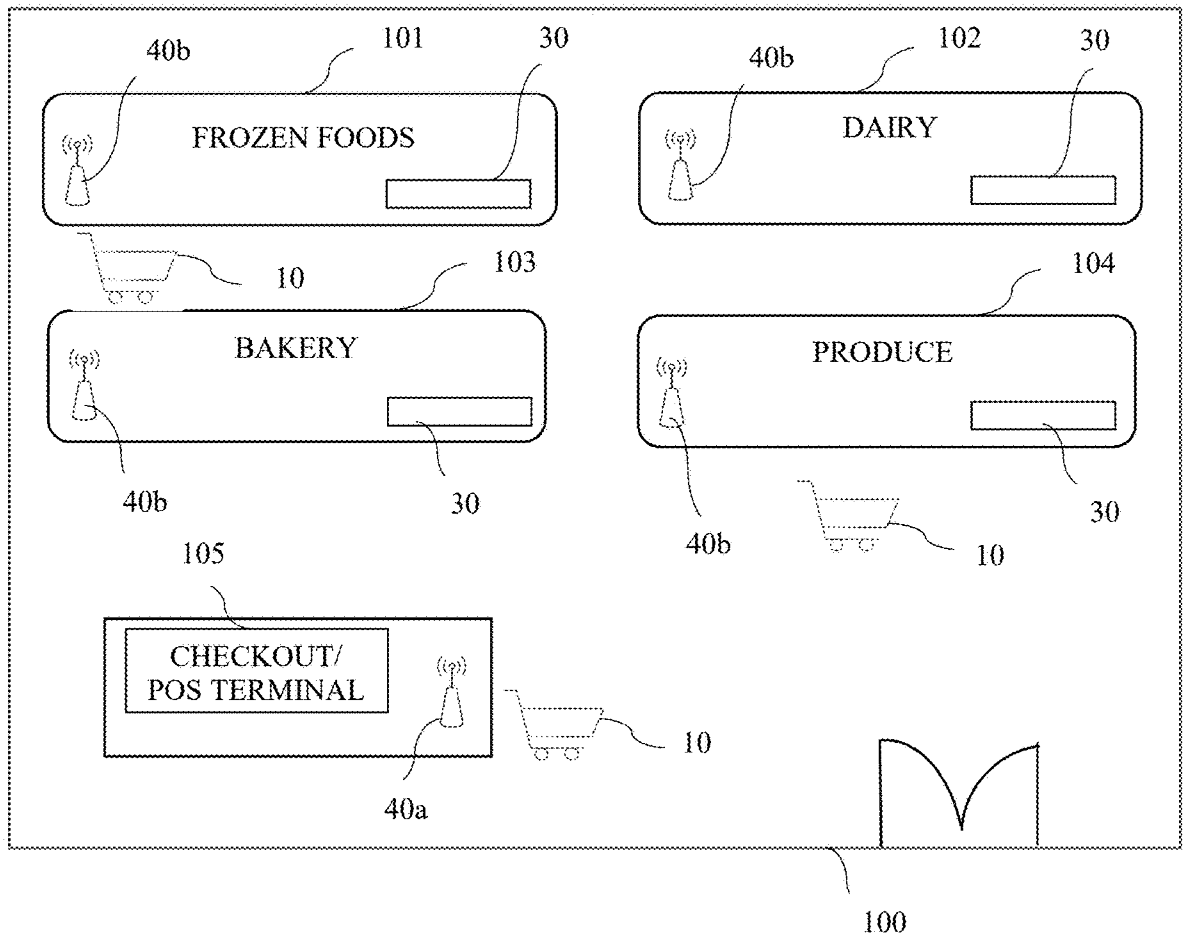
FIG. 2 is a schematic diagram showing positioning of the components of the exemplary system of FIG. 1 within a grocery store configuration.

With that in mind, in one exemplary embodiment, and referring first to FIGS. 1 and 2, an exemplary system for measuring in-store media exposure thus includes a cart 10 (e.g., a typical shopping cart with wheels) that includes an emitting device 12 secured to the shopping cart. Although the particular emitting device is not limited, in some specific embodiments, the emitting device 12 is in the form of a Bluetooth® low energy (BLE) emitting device and is included on each of the carts 10 to thereby provide an emitting device 12 that transmits a Bluetooth® signal using a "Bluetooth® Low Energy" (BLE) protocol and that is not only optimized for short-range data transmission and therefore suitable for nearby device interactions, but is also configured to consume minimal power and extend battery life such that the emitting device 12 on each cart 10 can be utilized for prolonged periods of time without recharging. Of course, it is contemplated that alternative wireless technologies, including RFID, near field communication (NFC), Zigbee, Thread, 802.15.4, and the like, can also be utilized without departing from the spirit and scope of the present invention.

By making use of BLE emitting devices 12, the emitting device 12 associated with each cart 10 is thus configured to and generally transmits an electronic identifying transmission over shorter distances and that includes only a small amount of data to identify the particular cart 10, such that the identifying electronic transmission can also be characterized as an electronic "ping." In this way, and to collect information about the location of the cart 10 upon transmitting such an identifying electronic transmission as it moves through a store, such as the grocery store 100 schematically depicted in FIG. 2, corresponding reading devices 40*a*, 40*b* (e.g., BLE reading devices or nodes) capable of receiving the identifying electronic transmission are then positioned around the grocery store 100 at predetermined locations. In some embodiments of the system, advertising displays 30 are located around the store and the BLE reading devices 40*b* are placed in proximity to these advertising displays 30. For example, in the grocery store 100, BLE reading devices 40*b* can be associated with an advertising display 30 in a frozen foods section 101 of the grocery store, a dairy section 102 of the grocery store, a bakery section 103 of the grocery store 100, and a produce section 104 of the grocery store 100. Such advertising displays can be in the form of, for example, electronic shelf modules, such as those described in U.S. Pat. Nos. 9,703,179 and 9,774,134, which are each incorporated herein by reference in their entirety. Additionally, in the exemplary system, a BLE reading device 40*a* is placed in proximity to each checkout counter or POS terminal 105.

As perhaps shown best in FIG. 1, each of the advertising displays 30 and associated reading device 40*b* as well as the checkout devices or POS terminals 20 and their associated reading devices 40*a* are then in further communication with a central computer 50 and associated database 60 that, in certain embodiments, associates the data received from each of the advertising displays 30 and the checkout devices or POS terminals 20, as described in further detail below.

Figure 3:
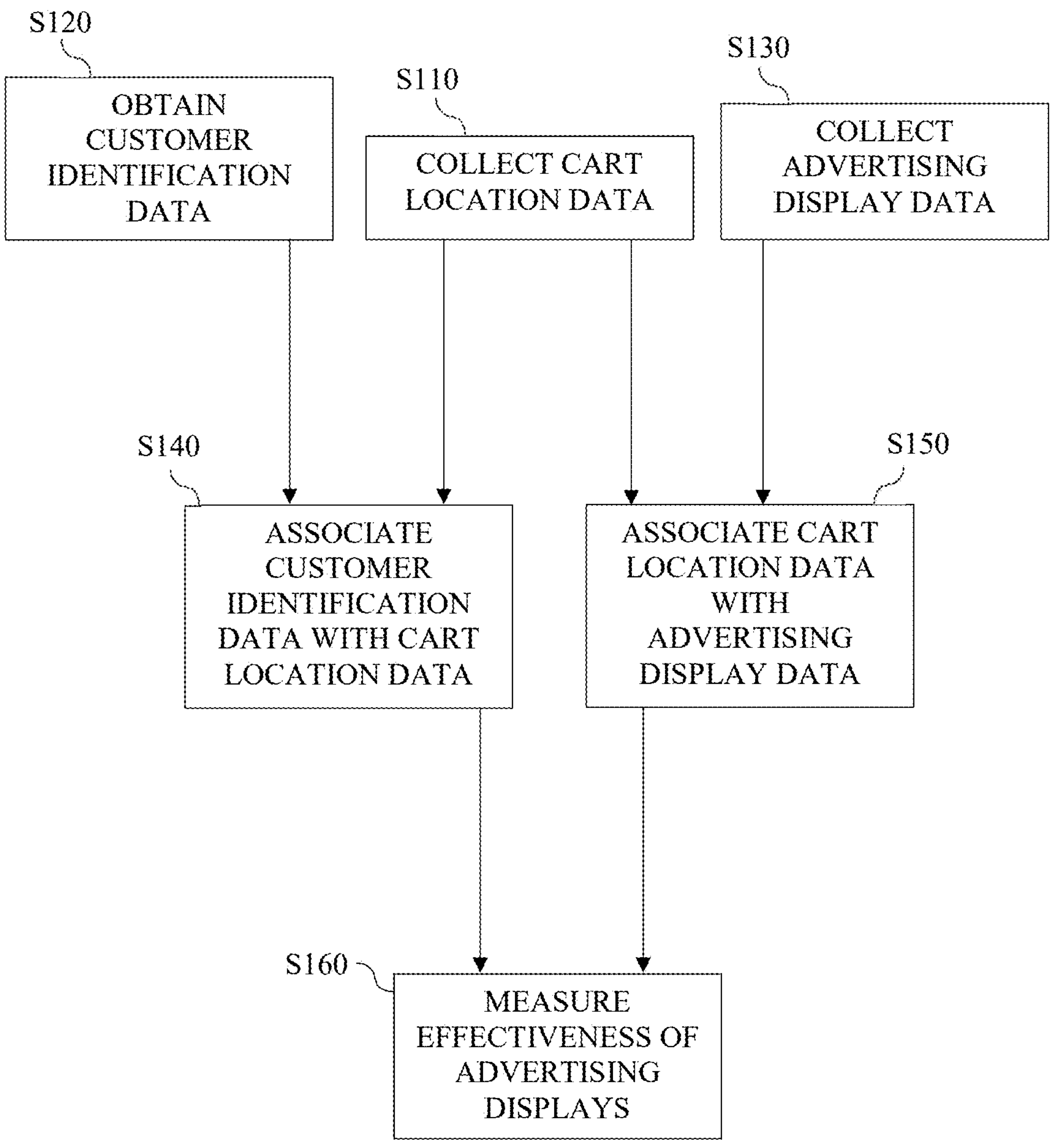
FIG. 3 is a process flow diagram showing an exemplary method for measuring in-store media exposure in accordance with one implementation of the present invention.

With the above exemplary system in mind, and referring now to FIG. 3, FIG. 3 is a process flow diagram showing one exemplary implementation of a method for measuring in-store media exposure in accordance with the present invention. In the exemplary method, in Step S110, cart location data is collected as a customer moves the cart around the store. In particular, each BLE reading device included with an advertising display records time data for when the cart was in proximity to each advertising display and how long the cart was in proximity to the advertising display. As previously mentioned, there is also a BLE reading device at each checkout counter so that the cart can be associated with a given transaction. As such, the BLE associations monitored by the BLE reading devices at the advertising displays and the checkout counter can be combined to create an individual cart's association file during a shopping trip.

The cart location data can either be stored locally on a computer included with the cart or it can be transmitted constantly or intermittently to a central computer. As such, the BLE emitting device on the carts and/or the BLE reading devices around the store may include some means of storing and transmitting data, as discussed further below.

Once the customer is done shopping, in Step S120, customer identification data is obtained at the checkout counter. Specifically, when the customer uses a loyalty card at checkout, the customer identification data is obtained through means well known in the art. The data collected through retailer loyalty cards is well-established and encapsulates a variety of purchase data at the household level. Such identification data can include point-of-purchase data associated with each of the customers each time a customer provides his or her loyalty account information at the time of a purchase, but can further include additional collected such as the amount spent in a particular time period (e.g., week, month, year, lifetime), visit frequency, purchase history, the frequency at which a particular product is purchased, the amount of a particular product purchased, and the like. Such customer identification data can either be stored locally on a computer included at the checkout counter or it can be transmitted constantly or intermittently to a central computer, such as the central computer 50 depicted in FIG. 1, as also discussed further below.

Additionally and referring still to FIG. 3, in Step S130, advertising display data is also collected for each of the advertising displays that the customer cart was in proximity to during the customer's visit. In some specific embodiments where the advertising displays are digital displays configured to display multiple different advertisements, the advertising display data includes which advertisement was displayed and when the advertisement was displayed. Once again, the advertising display data can either be stored locally on a computer included with the cart or it can be transmitted constantly or intermittently to a central computer. As such, the BLE emitting device on the carts and/or the BLE reading devices around the store may include some means of storing and transmitting data, as discussed further below.

Subsequent to the collection of the cart location data in Step S110 and obtaining the customer identification data in Step S120, the customer identification data can be associated with the cart location data in Step S140. As previously mentioned, the customer identification data is obtained at the checkout counter. As such, there is no connection between the cart location as it moves around the store and a particular customer until the customer checks out. In embodiments where a customer loyalty card is used, the customer must have the loyalty card scanned before the association is made and the cart is only associated with a customer at checkout when the loyalty card information is presented. In some specific embodiments, a BLE reading device placed in proximity to the checkout counter makes the final association between the cart data of the specific cart and the customer identification data. Of course, during checkout the typical purchase information is also gathered and associated with the customer through their loyalty card. The purchase information is likewise associated with the cart location data, as also discussed further below.

Subsequent to the collection of the cart location data in Step S110 and the collection of advertising display data in Step S130, the cart location data can be associated with the advertising display data in Step S150. During this step, it is determined what advertisement, or advertisements, were displayed when the cart was in proximity to the various advertising displays around the store, i.e., what advertisements the customer was exposed to during their shopping.

Finally, in a Step S160, the various data collected is used to measure the effectiveness of the advertising displays. Specifically, once the cart goes through the checkout lane and the BLE reading device identifies that a cart is checking out, that cart trip is associated with a customer and the purchases that customer has made during the trip. Additionally, based on the times the cart was within the vicinity of the advertising displays, the advertising that was displayed to the cart is determined, thereby connecting the cart to both the advertising played and purchasing data. The specific items purchased by the customer during that trip can be compared to the historic purchasing data for the customer. Changes in the purchasing behavior of the customer can then be determined based on the advertisements the customer was exposed to during their shopping based on well-established advertising measurement techniques.

Although the steps in FIG. 3 indicate a particular order, the association of the cart location data with the advertising display data in Step S150 can also be performed before, concurrently, or after the association of the customer identification data with the cart location data in Step S140. Furthermore, the three data streams collected in Steps 110, 120, and 130 may all be combined in a single analysis step to measure the effectiveness of the advertising display without first having specific data streams associated with one another.

The type of data connections made in accordance with the present invention are unique in the market in that it enables one to one measurement of the impact media exposures have on purchase behavior. This happens, in certain embodiments and implementations, by connecting the data in the following way: (a) the BLE reader associates a cart to specific hardware within the store at a specific time; (b) the cart is then connected to the loyalty card data, including purchase behavior, at the time of checkout; (c) the cart's association to hardware at a specific time is connected to the content management system, which shows what media played while the cart was within viewing range; and (d) an algorithm then brings all of this media together to show which customers were exposed to what media and how their purchasing behavior changed.

In short, the system and methods allow three different data streams to be brought together to create the ability to measure in-store media at a customer-specific or household level. The specific process by which they are combined creates the ability to measure in-store media in a way not yet seen in the market.

This systems and methods of the present invention further enables one-to-one advertising impacts to be assess at the household level and in a manner which does not require an individual opt-in by customers because it does not capture any additional personal information beyond what is already captured through the loyalty card. Geolocation information is not part of the data that is captured because the approach would only focus on advertising impressions. Advantageously, the system and methods of the present invention therefore provides one-to-one media advertising effectiveness measurements for an in-store shopping experience, similar to information gathered from online digital advertising, but while still complying with privacy laws regarding customer location data.

As described above, the cart location data collected in Step 110, the customer identification data collected in Step S120, and the advertising display data collected in Step S130 may be stored on computers at the specific locations where the data is collected or transmitted to a central computer, such as the central computer 50 described above with reference to FIG. 1. Communications between the central computer and the shopping carts, checkout counters, and digital advertising displays can be facilitated through direct communication between the various devices via a local network. Alternatively, in some embodiments, communications between the central computer and the shopping carts, checkout counters, and digital advertising displays can also be facilitated through an internet connection, satellite communication, or other similar communications network or known means of data transport, such that the shopping carts, checkout counters, and digital advertising displays can communicate with the central computer remotely located from the area where the shopping carts, checkout counters, and digital advertising displays are located.

In some embodiments, various devices located around the store, including but not limited to the shopping carts, checkout counters, and digital advertising displays discussed above, are networked to communicate between the devices as well as to remote computers over the internet or other communications networks. As such, the particular communication route is not limited. For example, in some embodiments, the different devices within a store may communicate on a local network to provide all of the data to one or more computers associated with the checkout counters which then communicates the data externally to a central computer.

Additionally, a database can be stored with the central computer as depicted in FIG. 1 or, alternatively, a database can be stored externally, such as on a server or cloud database accessible by the central computer. Each of the data streams may be stored within the database and query of the data can be initiated from by central computer for further processing and analysis. In some embodiments, instructions to add, insert, or otherwise modify data within the database may also be initialized from the central computer and sent to the database from the central computer to effectuate changes within the database. In some embodiments, a database management system may be utilized to facilitate the transmission of queries from the central computer to the database and query results from the database to the central computer.

In some embodiments, all of the data analysis is performed by a central computer. However, in other embodiments, one or more of the analysis steps can be performed by a local computer. For example, a computer associated with one of the digital advertising displays may associate the cart location data with the advertising display data in Step S150 before transmitting this associated data. Likewise, a computer associated with the checkout counter may, in addition to performing the typical analysis associated with a customer using a loyalty card, perform one or more of the steps of associating the customer identification data with the cart location data in Step S140 and associating the cart location data with the advertising display data in Step S150 before transmitting this associated data. These are merely exemplary and one of ordinary skill would understand that other divisions of computational labor are possible without departing from the spirit and scope of the present invention.

With respect to the analysis of the data, it will be readily apparent to one of ordinary skill in the art that software running on the local computer(s) and/or the central computer causes computer-readable instructions stored in a memory component to be executed by a microprocessor, thereby causing the computer to perform the various operations described herein. Such computer-readable instructions can be readily coded into computer readable form using standard programming techniques and languages by one of ordinary skill in the art.

It will be understood that various details of the present invention can be changed without departing from the scope of the subject matter disclosed herein. Furthermore, the foregoing description is for the purpose of illustration only, and not for the purpose of limitation.

What is claimed is:

1. A method for measuring in-store media exposure, the method comprising:

providing a cart including an emitting device;

collecting cart location data as a customer moves the cart around a store, the store including a plurality of advertising displays positioned around the store;

obtaining purchase information at a point of sale terminal positioned at a checkout counter of the store the checkout counter including a low energy reading device located in proximity to the checkout counter;

obtaining customer identification data of the customer at the point of sale terminal subsequent to the customer using a loyalty card at checkout;

associating the customer identification data and purchase information with the cart location data subsequent to the customer using the loyalty card; and measuring an effectiveness of the advertising displays in modifying purchasing behavior of the customer, the effectiveness of the advertising display based on the association of the customer identification data and purchase information with the cart location data.

2. The method of claim 1, wherein the emitting device is a Bluetooth low energy emitting device, and wherein a Bluetooth low energy reading device is located in proximity to each of the advertising displays.

3. The method of claim 2, wherein the cart location data includes time data for when the cart was in proximity to each advertising display and for how long the cart was in proximity to each advertising display.

4. The method of claim 1, further comprising a step of collecting advertising display data.

5. The method of claim 4, wherein the plurality of advertising displays include digital displays configured to display multiple different advertisements and the advertising display data includes at least one of: an advertisement displayed, which of the plurality of advertising displays displayed the advertisement, and when the advertisement was displayed.

6. The method of claim 5, further comprising a step of associating the cart location data with the advertising display data.

7. The method of claim 1, wherein the low energy reading device is a Bluetooth low energy reading device.

8. The method of claim 1, wherein measuring the effectiveness of the advertising displays in modifying purchasing behavior of the customer further includes comparing the purchase information to historic customer purchasing data.

9. A method for measuring in-store media exposure, the method comprising:

providing a cart including an emitting device;

collecting cart location data as a customer moves the cart around a store, the store including a plurality of digital advertising displays positioned around the store;

collecting advertising display data including at least one of: an advertisement displayed, which of the plurality of advertising displays displayed the advertisement, and when the advertisement was displayed;

obtaining purchase information at a point of sale terminal positioned at a checkout counter of the store the checkout counter including a low energy reading device located in proximity to the checkout counter;

obtaining customer identification data at the point of sale terminal subsequent to the customer using a loyalty card at checkout;

associating the cart location data, the customer identification data, and purchase information with the advertising display data subsequent to the customer using the loyalty card; and measuring an effectiveness of the advertising displays in modifying purchasing behavior of the customer, the effectiveness of the advertising display based on the association of the cart location data, customer identification data, and purchase information with the advertising display data.

10. The method of claim 9, wherein the emitting device is a Bluetooth low energy emitting device, and wherein a Bluetooth low energy reading device is located in proximity to each of the advertising displays.

11. The method of claim 10, wherein the cart location data includes time data for when the cart was in proximity to each advertising display and for how long the cart was in proximity to each advertising display.

12. The method of claim 9, wherein the low energy reading device is a Bluetooth low energy reading device.

13. The method of claim 12, wherein measuring the effectiveness of the advertising displays in modifying purchasing behavior of the customer includes comparing the purchase information to historic customer purchasing data.

14. A system for measuring in-store media exposure, the system comprising:

a plurality of carts, each cart including an emitting device;

a plurality of advertising displays positioned around a store, each advertising display including a reading device configured to record time data for when each of the plurality of carts was in proximity to the advertising display and how long the cart was in proximity to the advertising display;

a central computer configured to receive the time data from each of the advertising displays and associate the time data with advertising display data from each of the advertising displays to measure an effectiveness of the advertising displays in modifying purchasing behavior of a customer;

a point of sale terminal in communication with the central computer, the point of sale terminal configured to obtain customer identification data of the customer subsequent to the customer using a loyalty card at the point of sale terminal; and a low energy reading device located in proximity to the point of sale terminal, such that the customer identification data is associated with the time data when the customer identification data is obtained by the point of sale terminal.

15. The system of claim 14, wherein the advertising display data includes at least one of: an advertisement displayed, which one of the plurality of advertising displays displayed the advertisement, and when the advertisement was displayed.

16. The system of claim 14, wherein the emitting device is a Bluetooth low energy emitting device, and wherein a Bluetooth low energy reading device is located in proximity to each of the advertising displays.

* * * * *